Patented Oct. 24, 1922.

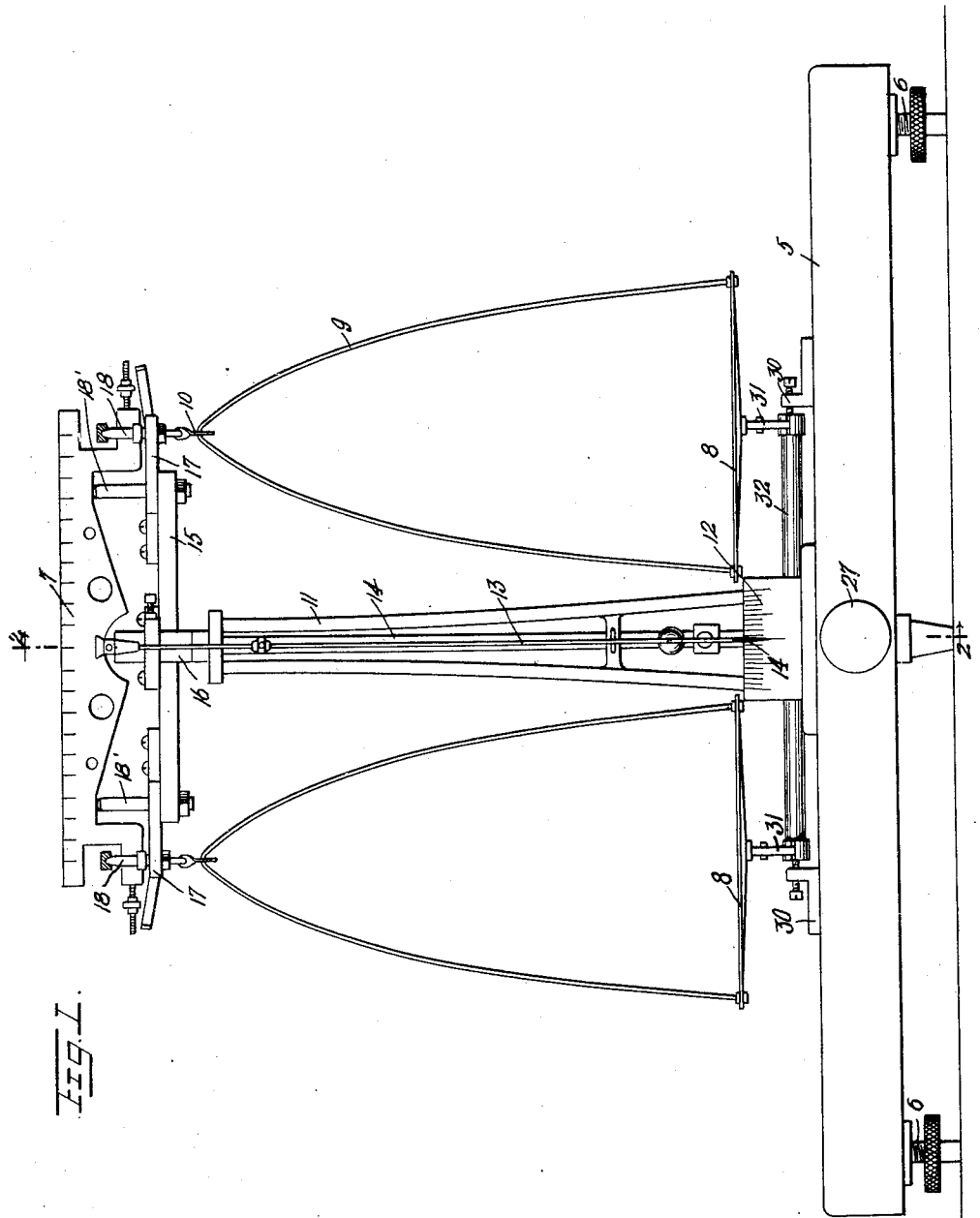

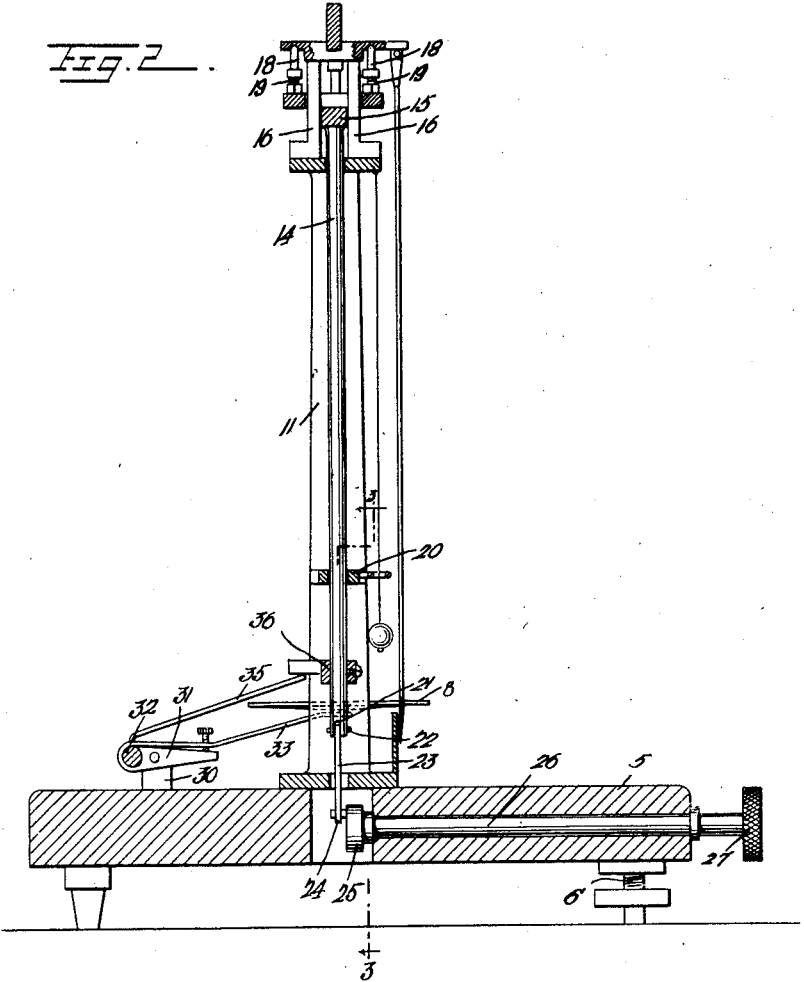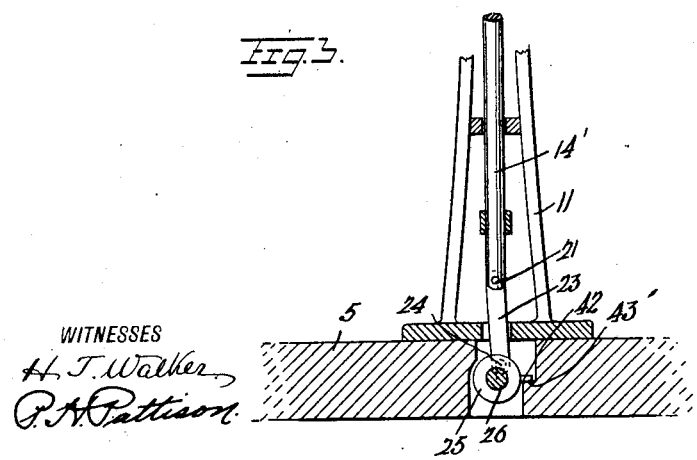

1,433,436

UNITED STATES PATENT OFFICE.

GEORGE GOTTFRIED VOLAND AND EMIL LUDWIG VOLAND, OF NEW ROCHELLE, NEW YORK.

SCALE.

Application filed July 26, 1920. Serial No. 399,055.

*To all whom it may concern:*

Be it known that we, GEORGE G. VOLAND and EMIL L. VOLAND, both citizens of the United States, and residents of New Rochelle, in the county of Westchester and State of New York, have invented new and Improved Scales, of which the following is a full, clear, and exact description.

The present invention relates to new and useful improvements in scales, and it pertains more particularly to scales of the more sensitive type. In scales of this type where adjustments are very minute, it is desirable to provide a mechanism whereby the several parts of the scales are secured against movement when the scales are not in use, thereby reducing to a minimum the possibility of a change in the finer adjustments of the scales.

Heretofore it has been common practice in the art to provide two mechanisms for this purpose, one of which engages the scale beam and lifts it from its bearing trunnions, the beam being engaged at opposite ends to prevent rocking thereof. The other mechanism engages the scale bows and pans and provides a support therefor. These two mechanisms have been operated singly, and it is the primary object of the present invention to so construct such a mechanism that the support for the scale beam and the support for the scale bows and pans are operated simultaneously.

With the above and other objects in view, reference is had to the accompanying drawings, in which—

Figure 1 is a front elevation of a scales constructed and arranged in accordance with the present invention;

Fig. 2 is a vertical sectional view thereof taken on the line 2—2 of Fig. 1, and Fig. 3 is a detail sectional view taken on the line 3—3 of Fig. 2.

Referring more particularly to the drawings, the reference character 5 designates the scale beam and said base is supported on feet 6 which are adjustable in order that a proper leveling of the base may be obtained. The reference character 7 designates the scale beam, and 8 designates the pans, said pans being suspended from the beam by means of bows or the like. The bows are detachably connected to supporting hooks 10, which in turn are suspended from the beam by means of knife-edge jewels in the ordinary manner.

The beam is supported in the usual manner from a standard 11, and said standard 11 is rigidly secured to the base 5 and carries at its lower extremity the graduated plate 12. The reference character 13 designates a pointer rigidly carried by the scale beam 7, and said pointer has an index finger movable across the face of the graduated plate 12 to give a reading of the scale. Extending vertically of the standard 11 is a rod 14', and said rod has rigidly secured to its upper end a cross-head 15. This cross-head 15 is slidably mounted between two vertical guides carried by the upper end of the standard 11, and upon each end of the cross head 15 is a stirrup support 17. Projecting vertically from the end of each of the furcations of each of the stirrup supports 17, is a rigid standard 18, and the lower end of each of these rigid standards 18 is screw-threaded as at 19, to provide for a vertical adjustment thereof. The ends of the cross head 15 are likewise provided with adjustable rigid standards 18', and these adjustable rigid standards are adapted to engage beneath the edges of the scale beam 7 as shown in Fig. 1, for a purpose to be set forth.

The lower end of the vertical standard 14 is guided in a bearing 20, and its lower extremity is bifurcated as indicated by the reference character 21. Pivotally connected by means of a pin or the like 22 in the bifurcated lower extremity of the rod 14, is a link 23, and said link 23 is pivotally connected as at 24, to a disk or the like 25 carried by the inner end of a rotating shaft 26. This rotating shaft 26 is mounted in the base 5 of the scales and is operated by means of a thumb nut 27 at the front of the base. By this mechanism it will be seen that as the shaft 26 rotates, through the medium of the link 23, the rod 14 is given a vertical movement, the reason for which will be hereinafter more clearly set forth.

Mounted on the base 5 to the rear of the vertical standard 11, are two bearing members 30, and mounted in said bearing members 30 are pivoted arms 31. These pivoted arms 31 are connected by means of a transversely extending rigid rod 32 so that the arms move about their pivotal points in unison. Each of these pivoted arms 31 carries an arm 33, and these arms are spaced with relation to each other in such a manner that each of the arms engages one of the scale pans 8 in order to support the same.

Carried by the rigid rod 32 connecting the arms 31, is an arm 35 adapted to engage a block 36 adjustably mounted on the rod 14 in order that as the rod 14 is moved vertically the arms 31 will be rocked about their pivotal points.

The device operates in the following manner, assuming that the several parts of the scales are accurately adjusted and it is not desired to use the same: In order to support the several parts in a rigid manner so that their adjustments may not be disturbed, the shaft 26 is rotated, which action will give a vertical movement to the rod 14'. As the rod 14' moves vertically, the arm 35 is adapted to rock due to the weight of the transverse rigid rod 32 rocking the pivoted arms 31 about their pivotal points. As this takes place, each of the arms 33 contacts with the under surface of its respective scale pan 8 and supports the latter. As the rod 14' moves vertically, the stirrups supports and the standards 18 move into engagement with the scale-pan supports to relieve their weight and the weight of the scale pans from the jeweled bearings heretofore mentioned, and, at the same time, to prevent movement of the scale pans relative to the scale beam. Simultaneously with the vertical movement of the rod 14', the rigid members 18' engage beneath opposite ends of the scale beam 7, and slightly lift it from its bearing point or support and hold the same rigidly against movement. By this construction when the scale beam is released by a turning of the key 27, the block 36 on the vertical rod 14 will engage with the rigid arm 35 and rock the gravity-actuated device about its pivotal point to disengage the arms 33 from the bottom of their respective bows and pans, and leaving the bows and pans freely suspended from the beam in order that a weighing operation may be carried out.

In order that the various mechanisms above described as being moved, may not be moved to a degree where the adjustment may be disturbed, the eccentric 25 on the inner end of the shaft 26 is provided with a stop 42, and said stop 42 is adjusted to engage a shoulder 43 formed in the base 5 in such a manner as to limit the movement of the shaft 26 at the proper predetermined time.

From the foregoing it will be apparent that the present invention provides means whereby the beam and scale pans of a scales of this type may be positively and rigidly supported when not in use, thus avoiding the possibility of a disturbance of the finer adjustment of the more sensitive parts of the scales.

Claims:

1. In a scales, a beam, pans carried by said beam, manually operated means movable into engagement with the beam to support the same in inoperative position, gravity-actuated means adapted to be released and move into engagement with the pans to support the pans in inoperative position upon the operation of the manually operated beam-engaging means, said manually-operated beam-engaging means being adapted to engage the gravity-actuated means upon operation to disengage the manually operated means from the beam for simultaneously disengaging the gravity actuated means from the pans.

2. In combination with a scales and its beam, manually operated means for engaging the beam adjacent its opposite ends for supporting the same in inoperative position, automatic gravity actuated means for engaging the pans to support them in inoperative position, and means for actuating the pan-supporting means to release the pans upon release of the scale beam.

3. In combination with a scale, its beam and pans, means adapted for engagement with the beam near its opposite ends to support the same in inoperative position, said means being manually operated, separate means automatically operated for engaging the pans to support them in inoperative position, and means whereby said automatic pan-supporting means is released upon movement of the manually operated beam-supporting means to beam releasing position.

4. In combination with a scales and its beam, manually operated means adapted for engagement with the beam to support the same in inoperative position, gravity actuated means adapted to automatically engage the scale pans to support them in inoperative position upon operation of the beam supporting means, and means for engagement with said gravity-actuated means to move the same from pan-supporting position simultaneously with the movement of the beam-supporting means from beam-supporting position.

5. A device of the character described comprising in combination, a base, a standard projecting therefrom, a beam pivotally mounted on said standard, a vertical shaft slidably mounted in said standard, means carried by said shaft for engagement with the beam to support the same in inoperative position, means for reciprocating said vertical shaft to move the beam-supporting means to beam-supporting position, gravity-actuated means released by the vertical movement of said shaft and adapted to engage the scale pans to support them in inoperative position, and means carried by said vertical shaft and adapted to move the pan-supporting means out of pan-engaging position simultaneously with the movement of the beam-supporting means out of beam-supporting position.

6. In a scales, a base, a beam, scale pans carried by the beam, manually operated means for liting the beam and positively engaging the same to support it in inoperative position, gravity-actuated scale-pan-engaging means released to the action of gravity upon the manual operation of the beam-supporting means to move the beam-supporting means to beam-supporting position, said gravity-actuated scale-pan-engaging means being adapted to be operated positively to disengage the scale pans upon movement of the beam-supporting means to position where it is inoperative as such.

7. In a scales, a base, a standard projecting vertically therefrom, a scale beam supported by said standard, a plurality of scale pans supported by said scale beam, manually operated means for engaging the beam to support the same in inoperative position, gravity-actuated means adapted to engage the pans to support the pans in inoperative position, said gravity-actuated means being released upon movement of the beam-supporting means to beam-supporting position, and manually-operated means for simultaneously moving the beam-supporting means out of beam-supporting position and the pan-supporting means out of pan-supporting position.

GEORGE GOTTFRIED VOLAND.
EMIL LUDWIG VOLAND.